United States Patent [19]
Harlan

[11] 4,227,572
[45] Oct. 14, 1980

[54] FINNED TUBING

[75] Inventor: Courtney S. Harlan, Medina, Ohio

[73] Assignee: Seton-Scherr, Inc., Medina, Ohio

[21] Appl. No.: 890,369

[22] Filed: Mar. 27, 1978

[51] Int. Cl.³ .............................................. F28F 1/36
[52] U.S. Cl. ............................ 165/184; 29/157.3 AH
[58] Field of Search .................... 165/184; 29/157.3 R, 29/157.3 AH, 157.3 B; 113/118 A

[56] References Cited

U.S. PATENT DOCUMENTS

| 242,300 | 5/1881 | Gold . | |
|---|---|---|---|
| 2,201,024 | 5/1940 | Brown, Jr. | 29/157.3 A |
| 3,326,283 | 6/1967 | Ware . | |
| 3,362,058 | 1/1968 | Morris et al. | 113/118 A |
| 3,417,451 | 12/1968 | Gunter et al. . | |
| 3,947,941 | 4/1976 | O'Connor et al. . | |

FOREIGN PATENT DOCUMENTS

| 1354623 | 1/1964 | France | 165/184 |
| 579610 | 8/1946 | United Kingdom | 165/184 |

*Primary Examiner*—Samuel Scott
*Assistant Examiner*—Theophil W. Streule, Jr.

*Attorney, Agent, or Firm*—Teare & Teare

[57] ABSTRACT

Finned tubing for use in heat exchangers has tapered helical fins with serrations disposed between connecting webs. The opposed edges of the serrations, interior of the periphery, taper to a relatively sharp edge. Shark-fin like protuberances project outwardly adjacent one leg of each serration with each protuberance having a flange thereon. In one modification, the serrations on adjacent fins are spirally aligned. One method and apparatus of producing the finned tubing subjects a tensioned strip to graduated compression to curl the strip onto a tube to form fins, while simultaneously relieving a portion of the compression at spaced points along the periphery of the strip, resulting in a tearing of the strip to provide the serrations, and the adjacent protuberances. The protuberances are then compressed by rollers to form the flanges. An apparatus for carrying out the method includes a pair of rotary members to taper and curl the strip, with one of the rotary members having a series of recesses. Another method of producing some form of serration uses a raised projection on a rotary member instead of a recess.

7 Claims, 18 Drawing Figures

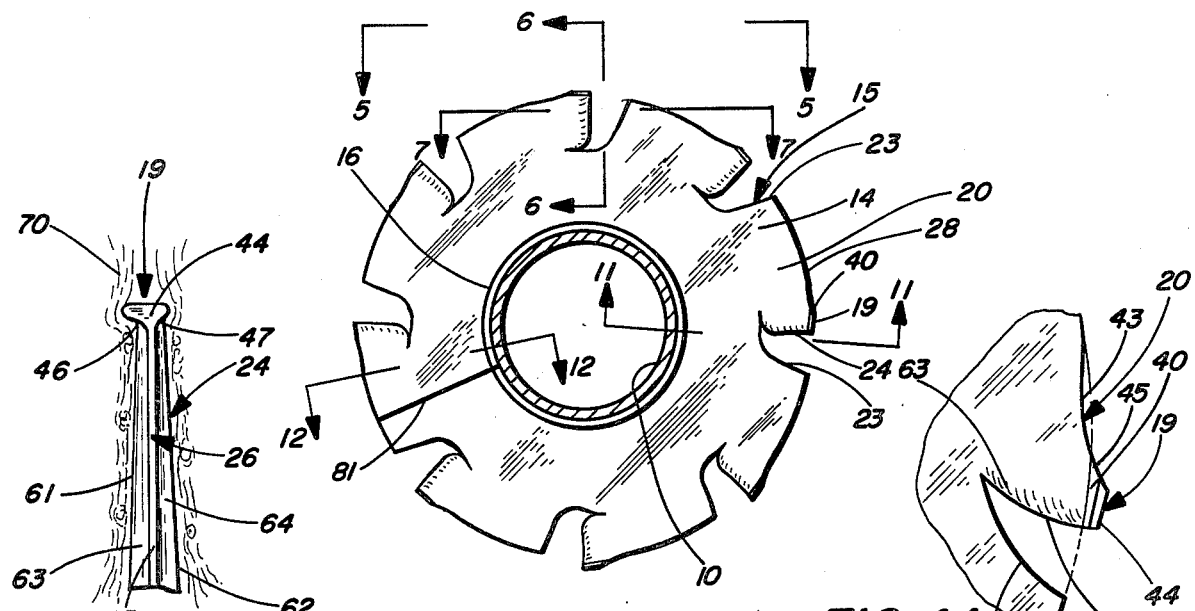
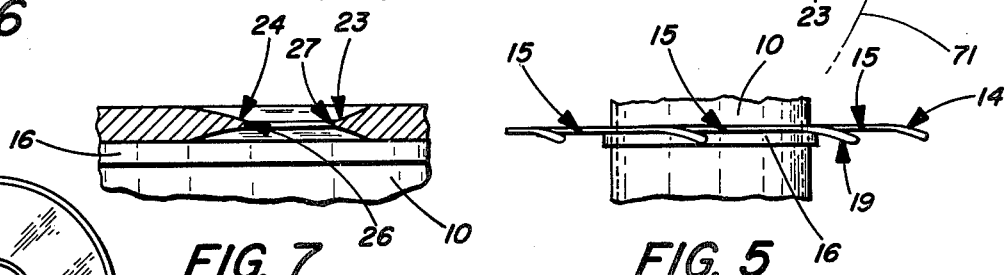
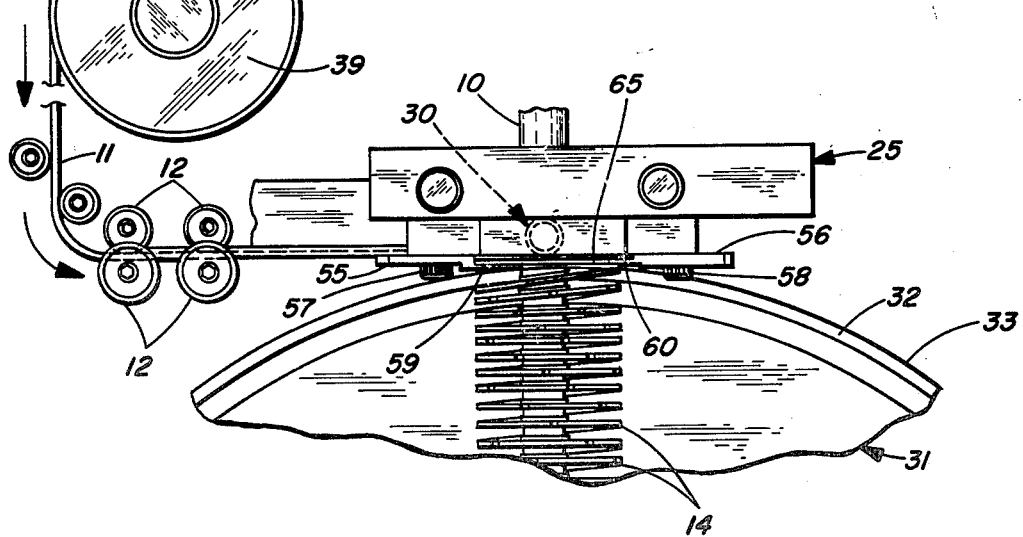

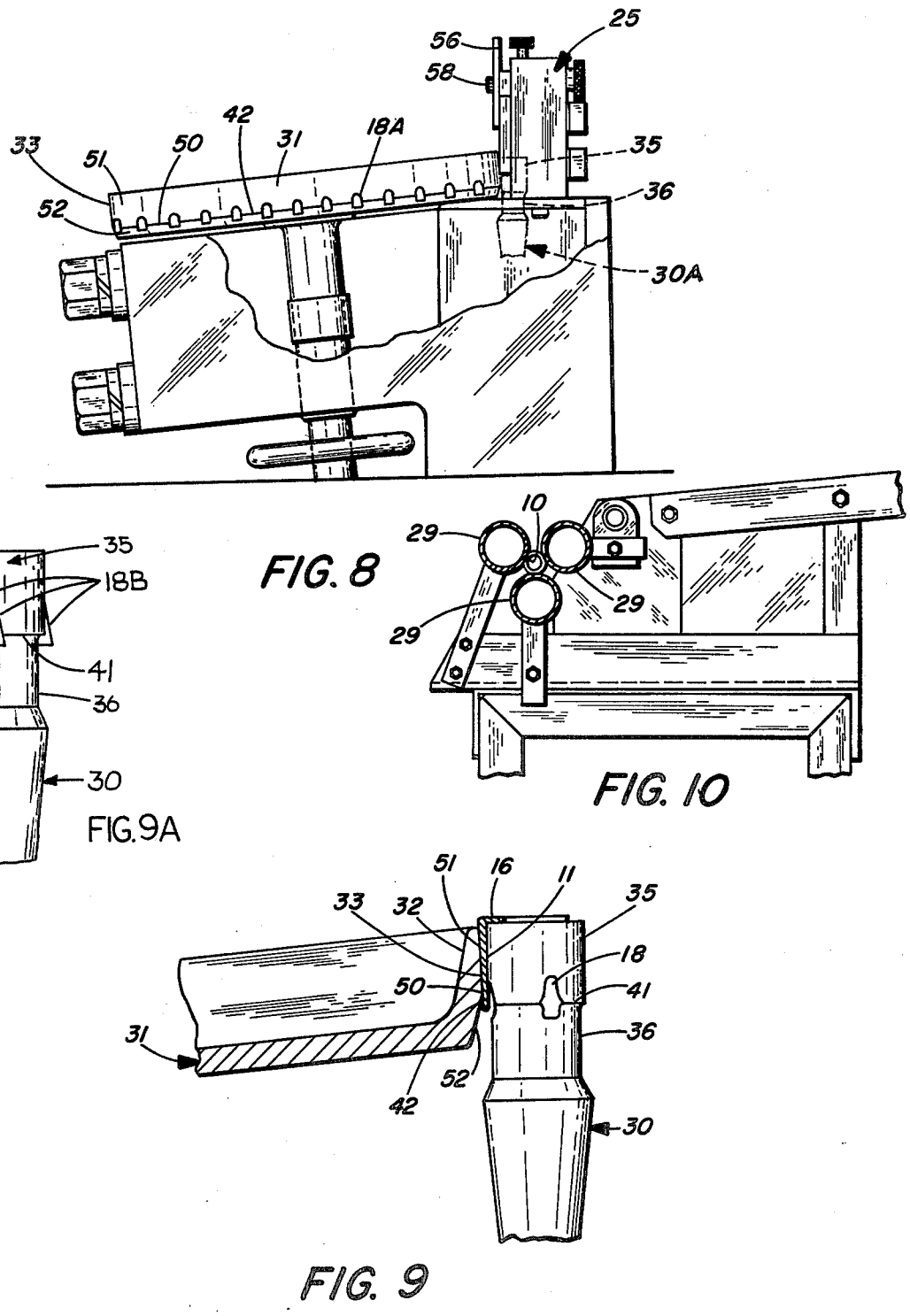

FINNED TUBING

BACKGROUND OF THE INVENTION

The present invention provides a finned tubing for heat exchangers having improved heat transfer characteristics for heating or cooling.

In one form of heat exchange, a gas is caused to flow past and in contact with the exterior of tubing which contains a liquid or a gas of a different temperature flowing therethrough. An example of such heat exchange is provided by a typical Air Cooled Heat Exchanger employed for fluid cooling or condensing. The fluid to be cooled or condensed passes through parallel disposed and manifold connected finned tubes which are generally arranged in layers. Ambient air is forced transversely across the finned tubes by either forced or induced draft fans. Fins are conventionally provided on the tubes to increase the effective heat transfer surface. Generally, the heat-transfer coefficient of the fluid inside the tubes is greater than the heat transfer coefficient on the outside finned surfaces which are in contact with the moving air.

Smooth fins provide the least resistance to air flow and consequently require the least fan horsepower to move the air past and in contact with the fins. However, because the fins were smooth, they did not create sufficient turbulence for optimum heat transfer. Roughness on fin surfaces, protrusions, or edges that break up the air flow over the fins resulted in added turbulence which improved the rate of heat transfer per unit of external fin tube surface. However, the more the air flow is broken up to add turbulence, the more horsepower is needed to force the air between the fins and through the rows of finned tubes.

In the past helically wound fins have been cut, notched, serrated, and twisted to provide tortuous paths for the air to add turbulence. However, the structure to create the turbulence has often also provided excessive resistance to air flow and thus has been counterproductive, as the overall energy balance has been made unfavorable by requiring excessive power to move the air across the heat transfer surfaces at minimal additional gain in heat transfer.

In addition, in the past, serrated tubing has been formed by completely or partially cutting the serrations by cutting tools. For example, in one method, the fins are formed on the tube, and the serrations thereafter cut therein. In still another method, one portion of each serration is pre-cut, with the remainder of the serration tearing as the fin is formed on the tube. Such prior art methods were either time consuming, difficult to control, costly, or required specialized equipment.

SUMMARY OF THE INVENTION

In accordance with the present invention, a serrated finned tubing is provided having novel gas flow characteristics. A relatively thin tapered strip of metal is helically disposed on a tube to provide a plurality of helically wound fins, with each fin having a plurality of serrations separated by connecting webs along the fin periphery. A shark-fin like projection on the web adjacent at least one leg of each or selected serrations is provided with a flange to increase the turbulence of the air as it passes down into the serration as well as to increase the amount of air which is drawn inward into the serration rather than gliding past the serration and out of heat transfer contact. The interior of the serration has relatively sharp edges so as to minimize air buildup and consequent resistance within the serration. Accordingly, the improved tubing provides a controlled and desired turbulence without a corresponding excessive increase in the amount of energy to force the heat exchange gas past the serrated fins. In one modification, the serrations of adjacent fins are spirally aligned at an angle to the sprial alignment of the fins.

Another aspect of the method is to form the serrations by a tearing action while the fins are being wound onto the tube. In a known process for winding a strip of metal onto a tube to form fins, the strip, while under tension, is subjected to graduated compression so as to taper the strip and cause it to curl in helical form onto the tube. In accordance with the present invention, a portion of the compression is changed at spaced points along the periphery of the strip whereby a portion of the metal returns toward its original shape, with the combined action resulting in the tearing of the strip to provide serrations without the need of a separate cutting operation.

One known apparatus for winding a strip of metal in helical form onto a tube utilized a pair of rotating members to apply the graduated compression to taper the strip to cause it to curl onto the tube. A plurality of recesses on one of the rotating members provides the desired relief of compression to cause the tearing of the metal to produce the desired serrations.

In the present invention, a new finned tubing with specially shaped serrations provided whereby the amount of turbulence can be controlled and incrementally varied for each cooling or condensing application by varying the number and shape of the specially shaped serrations on the outer periphery of the helically wound fins. This permits a more accurate design and optimum overall sizing of air cooled heat exchangers.

Furthermore, the new finned tubing can result in more compact, efficient and economical heat exchangers. A more favorable balance is achieved between the increased rate of heat transfer due to turbulence and the energy consumed in moving the air across the heat transfer surfaces.

In addition, the method of producing finned tubing is more economical as the serrations are produced at high speed without the need for additional cutting operations.

BRIEF DESCRIPTION OF THE DRAWINGS

FIG. 3 is a fragmentary, top plan view of a portion of the machine of FIG. 1 on a scale larger than that of FIG. 1;

FIG. 4 is an elevation sectional view through the pipe illustrating a fin made in accordance with aspects of the invention;

FIG. 4A is an enlargement of a typical serration and adjacent webbing of a serration of FIG. 4;

FIG. 5 is a top plan view taken along the line 5—5 in FIG. 4, illustrating the top plan view shape of the web portions between serrations;

FIG. 6 is an enlarged end view of one leg of a serration taken along the lines 6—6 in FIG. 4 and illustrating the sharp leg edge and the peripheral flange;

FIG. 7 is a fragmentary cross section view taken along the lines 7—7 of FIG. 4 and illustrating the sharp edge of the legs of a serration;

FIG. 8 is an enlarged front elevation view of a portion of the machine of FIG. 1, showing a modification of the invention;

FIG. 9 is a fragmentary enlarged view, partly in section, showing a metallic strip being tapered by a rotating pan and spindle with recesses on the spindle in accordance with the present invention;

FIG. 9A is a fragmentary enlarged view of a modification of the invention showing a spindle having raised projections;

FIG. 10 is an end elevation view, partly in section, illustrating rollers for compressing the periphery of the finned tubing to form the web flange shape of FIG. 4A.

DESCRIPTION OF THE PREFERRED EMBODIMENTS

The present invention relates to an article of manufacture known as finned tubing.

Figure 2:
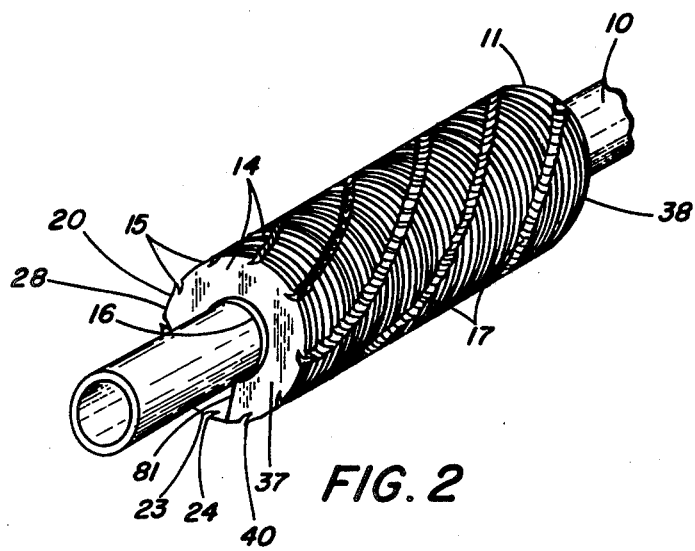
FIG. 2 is a perspective view of a finned tubing showing aspects of the invention.
Figure 12:
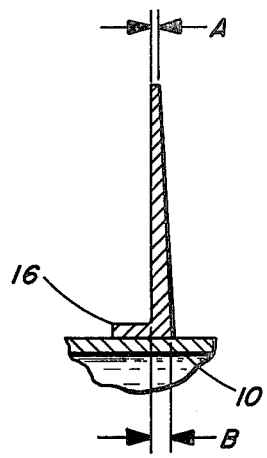
FIG. 12 is a section taken along the lines 12—12 in FIG. 4 and illustrating the shape of a serrated fin adjacent the leading leg of a serration.

As shown in FIG. 2, a metallic tube 10 has a continuous tapered strip 11 of metal, helically disposed about its circumference to form a plurality of fin convolutions 14. Each fin 14 has a plurality of serrations 15 separated by intervening webs 20 along its outer periphery 28. Shark-fin like protuberances 40 (FIG. 4A) project in a generally radially outward direction adjacent the trailing leg 24 of each serration. The outer periphery of the protuberances 40 define a flange 19 which increases the turbulence of the air and causes a greater amount of the air to flow into the adjacent serration which has opposed legs 23 and 24 which are drawn out and thinned so as to provide relatively sharp edges 26 and 27 to provide reduced resistance to the increased turbulence. As a result of the foregoing arrangement, increased turbulence without a corresponding excessive increase in resistance is provided. Strip 11, which is helically disposed on the tube 10 to form the fins 14, is made from a suitable material such as aluminum. The body of each fin 14 of the strip 11 is relatively thin, having for example, a greatest thickness "B" of 0.018 inches adjacent the tube 10 (FIG. 12), and tapering to a thickness "A" adjacent the periphery of one half such thickness, for example to 0.009 inches. The strip 11 is secured to the tube 10 by tension or other suitable means. For example, the strip 11 may have a foot 16 which rests on the tube 10 and is secured thereon by the tension of the winding operation.

Each serration 15 has a leading leg 23 disposed on the spiral on strip 11 in the direction toward the commencement 81 of the spiral and an oppositely disposed trailing leg 24 (FIG. 2). A web portion 20 (FIG. 4) of the fin 14 connects the trailing leg 24 of one serration, with the leading leg 23 of the adjacent serration. The outer periphery 28 of the web 20 is generally in the form of arcuate segments of a circle. Such circumferential arrangement is designated by the phantom line 71 in FIG. 4A. In accordance with one aspect of the invention, a shark-fin like projection 40 extends adjacent at least one leg of the serration peripherally of the general circumferential line 71 defined by the general shape of the periphery of web 20. In the form shown, the fin 40 first has a dip 43 which drops below the circumferential line 71 and then a rising portion 45. The fin 40 has at its tip a flange 19 (FIGS. 4A and 6). The flange 19 has a top surface 44 and projecting wings 47 and 46. As shown, one of the wings, such as wing 46, may project more than the other. As shown in FIG. 6, air striking the flange 19 is caused to be made turbulent prior to entering the serration.

In accordance with another aspect of the invention, the legs 23 and 24 of each serration are relatively sharp so that the increased turbulent air does not build up on the serration legs causing resistance. As shown in FIG. 6, the sides 61 and 62 of the web 20 terminate in angular faces 63 and 64 which taper to a relatively thin terminal edge 65 so that the general edge of each serration, shown generally as at 26 and 27, is relatively sharp. By the foregoing arrangement, increase in turbulence to aid in the rate of heat transfer does not build up excessive resistance so as to cause a corresponding increase in horsepower to move the air past the fins.

The serrations may be aligned as desired from fin to fin. For example, the serrations on adjacent fins may be in alignment axially of the tube, as is conventional in the art.

In another aspect of the invention, a novel alignment of serrations, whether or not such serrations have the aforedescribed features, of shark fin 40 and flange 19, is illustrated in FIG. 2. In such arrangement, the serrations 15 are spirally aligned to form spiral paths 17 which are at an angle to the spiral path for air between the fins 14.

The aforementioned finned tubing may be formed by the use of cutting tools. In such case, either the serrations, together with the fins, may be cut out of stock material; or if preferred, the fins can first be formed in a continuous helix onto a tube. Thereafter, the various shapes of the novel tube may be cut therein. The cutting could be manual, or it could be made by machines having cutting tools which move in a pattern.

In accordance with one aspect of the invention of the present application, serrations and the adjacent shark fin protuberances can be formed solely by tearing rather than cutting the metal. Such tearing is produced by a method which produces serrations while a strip which forms the fins is being wound upon the tube. Such result is achieved by varying a known process. In accordance with a process well known in the art, performed in the McElroy U.S. Pat. No. 3,388,449, a strip of material under tension is subjected to angular compression to taper the material to cause it to curl onto the tube in a spiral form. It is believed that the tapering of the strip stretches the outside fibers more than the inside fibers, causing the strip to curl in a spiral about the rotating advancing tube. In accordance with one aspect of the aforesaid method is modified by relieving a portion of the compressive force adjacent the periphery of the strip to allow a portion of the compressed and tapered metal to be displaced to cause a tearing action. It is believed that such relief of pressure, while the remainder of the strip is under compression and tension and curling onto the tube, provides the force whereby the desired tearing occurs.

An improved apparatus for producing a finned tubing in accordance with one aspect of the present invention is illustrated in FIGS. 1, 3, 9 and 10. Such apparatus is an improvement of the fin forming apparatus of the type illustrated in the McElroy U.S. Pat. No. 3,388,449. A form of device which follows the teachings of the McElroy patent is sold by the McElroy Manufacturing Inc., of Tulsa, Okla. and identified as a 3S Finned Tube Machine. It has been found that if recesses are properly placed on one of the rotating members of such machine, serrations as described herein can be produced while the strip material is winding on the tube to form fins. Since the operation of the components for winding a fin helically onto a tube 10 are described in detail in the McElroy U.S. Pat. No. 3,388,449, only general reference to the general components will be made herein.

A fin forming machine, as shown generally at 21, has a frame 13 upon which various components are mounted. A drive head 22 rotatingly and axially moves a tube 10 in the direction of arrow 74. A forming head shown generally at 25 contains a pair of rotating members 31 and 32 to apply a metallic strip in the form of fins 14 onto the tube 10, (FIG. 3).

Figure 11:
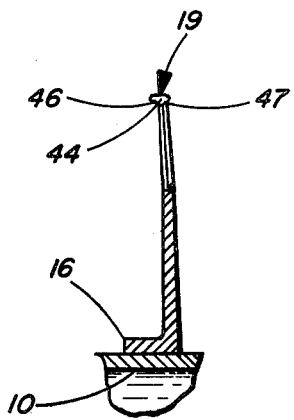
FIG. 11 is a sectional view taken along the lines 11—11 in FIG. 4, and illustrating the taper of a fin adjacent the trailing edge of a serration.

As shown in FIG. 3, a strip 11 is drawn from a supply roll shown schematically at 39 by a set of forming rolls 12 which bend the strips 11 to form a foot 16 thereon. The foot 16, as shown in FIGS. 3 and 11, constitutes the portion of each fin convolution which engages the tube 10, when the strip spirals onto the rube to form the fins 14.

In the operation of the machine, strip 11, with the foot 16 formed thereon, leaves the foot forming station 12 and passes between two rotating members, in the form of a spindle 30 and a pan 31, which are rotatingly mounted on the forming head 25. As shown in FIG. 9, the outer face 33 of the flange 32 of the pan 31 is disposed at an angle to the work engaging portion 35 of the spindle 30. By such arrangement, the body of the strip 11 is compressed into a tapered shape. Because the strip 11 is gripped both at the foot forming station 12 and at the other end by the rotating spindle 30 and pan 31, the strip is under tension as well as compression as it passes between the rotating members 30 and 31. Such compression and tapering of the tensioned strip 11 causes the strip to curl onto the rotating tube 10 as shown in FIG. 3, as is well known in the art. By adjusting the angle of roll, the size of the curl is adjusted. The adjustment of the compressive force between the primary forming roller, or pan 31 and spindle 30 controls the amount of taper applied to the strip 11. The surface speed of the pan and spindle is synchronized with tube axial speed, by suitable control adjustments known in the art. For example, one skilled in the art of operating the aforesaid machine knows that over-speed of the finning will produce a loose fin, and that under-speed will produce a fin that is difficult to make stand up. The adjustments for such a machine are described in the aforesaid McElroy patent and are well known in the art.

To guide the convolutions of the fin material across the flange 32 of the pan, the head 25 as shown in FIG. 3 has bars 55 and 56 pivotally mounted thereon by clamping screws 57 and 58 respectively, on opposite sides of the tube 10. The inner ends of the bars terminate in fingers 59 and 60 respectively for engaging opposite faces of the first fin convolution 65 and guiding it across the flange 32 of the pan. Thereafter, the convolutions of the fin strip automatically assume a regular pattern of spiral formation.

A plurality of indentations 18 (FIG. 9) are formed on the spindle (such as by grinding the metal of the spindle) to relieve the compressive force in the region where the spindle will contact the outer peripheral edge of the strip 11. For example, such region occurs in a conventional spindle adjacent a line 41 which divides the spindle into an upper work engaging portion 35 and a lower reduced portion 36. The line 41 on the spindle is disposed opposite to a similar line of demarkation 42 on the pan flange 32, which divides the outer surface 33 of the flange 32 into an upper surface 51 and an inwardly downwardly inclined surface 52. Each indentation has a portion thereof lying above the line 41 on the spindle and a portion thereof lying below the line 41. Thus, as the strip passes between the spindle and pan, any portion of the strip which is adjacent an indentation is torn to make a V-shaped serration 15 as shown in FIG. 4.

Figure 1:
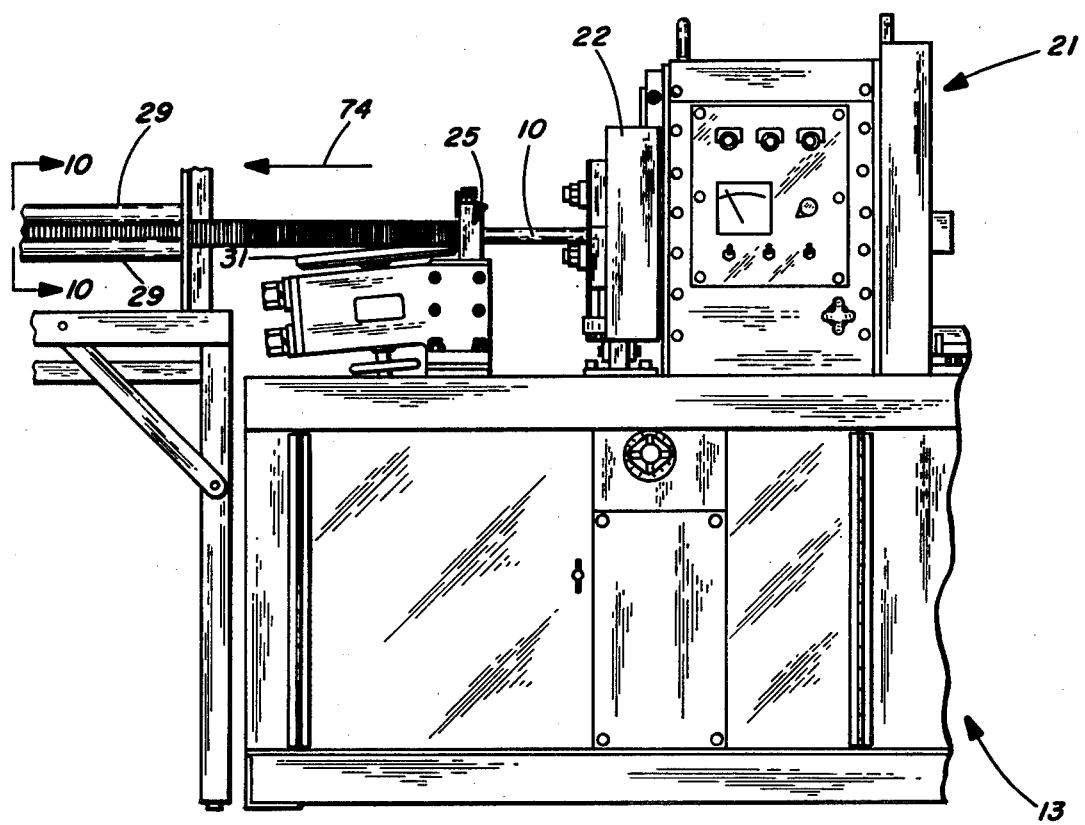
FIG. 1 is a front elevational view of a portion of a machine for forming fins on a tube.
Figure 13:
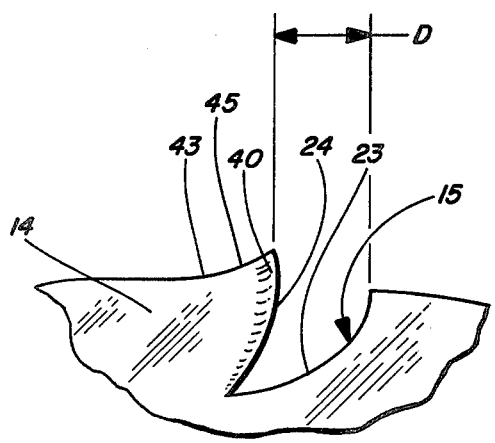
FIG. 13 is a fragmentary enlarged view of a fin showing the appearance of the shark-fin projection prior to passing through the rollers of FIG. 10.
Figure 14:
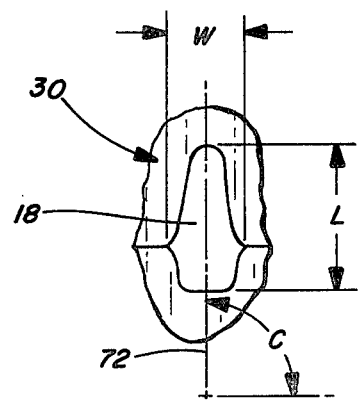
FIG. 14 is an enlarged fragmentary view of one of the recesses on the spindle of FIG. 9.
Figure 15:
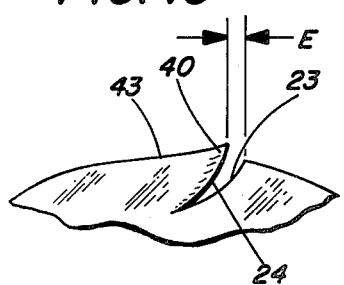
FIG. 15 is an enlarged fragmentary view of a serration of narrower width and length and of a lower shark-fin like projection than that of FIG. 13.
Figure 16:
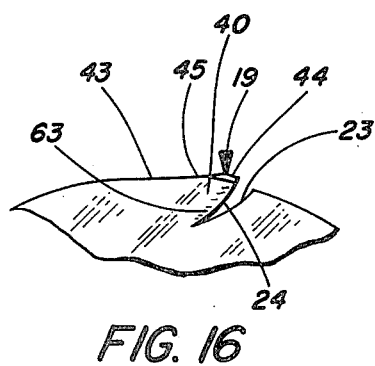
FIG. 16 is a fragmentary view illustrating the appearance of the shark-fin like projection of FIG. 15 after a flange has been formed thereon.

FIG. 13 illustrates the appearance of the serrations after the fins 14 have been formed onto the tube 10, but before the finned tubing reaches the conventional conveyer rollers such as rollers 29 (FIGS. 1 and 10). Such rollers exert pressure on the shark-fin like projections 40 to deform their peripheries from the flange-free shape of FIG. 13 to the flanged shape of FIG. 4A. The height of the shark-fin like protrusion 40 can be determined by varying the width W (FIG. 14) of the recess 18 on the spindle 30. For example, a narrower width "W" of recess 18 causes the shark-fin like protrusion 40 to project less further peripherally, and also reduces the span between legs 23 and 24. FIG. 15 illustrates such lesser projection of the shark-fin 40 as compared to the projection thereof shown in FIG. 13. FIG. 16 shows the shark-fin like projection to FIG. 15 with a flange 19 formed thereon by the fin passing through the rollers 29. It is to be understood that the pressure exerted by the rollers can be adjusted to vary the size of the flange 19.

The depth of the serration 15 can be varied by varying the length of the recess 18 in the spindle 30. Similarly, the shape of the serration can be varied by changing the angle C that the imaginary central axis 72 of the recess 18 makes with the horizon.

A modification of the apparatus for carrying out the method is shown in FIG. 8 wherein indentations 18A are formed on the outer surface 33 of the pan 31 instead of on the spindle 30 for tearing the strip of fin material as it is moving onto the tube. The indentations on the pan 31 extend across a line 50, above which, as at 51, the exterior surface of the pan is substantially cylindrical, and below which as at 52, the exterior surface of the pan is an inverted frustum in shape. In such modification, the surfaces 35 and 36 of the spindle 30 are free of recess. Accordingly, as the strip passes between the pan 31 and the spindle 30, a serration is formed each time the edge of the strip passes an indentation 18A on the flange 32 of the pan 31.

In a further modification, some form of serrations may be achieved by placing raised projections on one of the rotating members. For example, as shown in FIG. 9A, projections 18B are disposed on the rotary member instead of a recess or indentation.

I claim:

1. A finned tubing for use in heat exchange comprising, a cylindrical tube,
   a strip of material helically disposed about said tube to form a series of helically disposed fin convolutions,
   a plurality of said fin convolutions having generally radially outwardly extending webs defining serrations therebetween along the outer periphery of said fin convolutions,
   the sides of said webs extending inwardly of said periphery and defining the opposed legs of said serrations,
   a laterally extending flange disposed on the periphery of each web adjacent at least one of said sides,
   said flange being wider than the general thickness of said fin convolution adjacent said flange,
   said one side having faces which taper to a terminal edge so as to provide a relatively sharp edge on at least one leg of each serration inwardly of said flange.

2. A finned tubing in accordance with claim 1 wherein said faces taper in the general direction of the fin convolution from which they project.

3. A finned tubing in accordance with claim 2, wherein both opposed legs of the serrations have a relatively sharp edge.

4. A finned tubing for use in heat exchangers comprising,
   a cylindrical tube,
   a strip material helically disposed about said tube to form a series of helically disposed fin convolutions,
   said fin convolutions having serrations on the outer periphery thereof to provide alternating webs and serrations with the web periphery being generally disposed in a circumferential direction and the serrations having opposed legs,
   with a portion of the web projecting generally radially peripherally of the general circumferential disposition of the web adjacent at least one of said legs.

5. A finned tubing in accordance with claim 4 wherein, the peripheral projecting portion of the web is generally in the configuration of the dorsal fin of a shark.

6. A finned tuging in accordance with claim 4, wherein said projecting portion has a peripheral flange which projects laterally of said projecting portion.

7. A finned tubing in accordance with claim 6, wherein said legs define edges which are sufficiently reduced in thickness so as to provide relatively sharp edges.

* * * * *